Feb. 23, 1943.    G. S. ALLIN    2,311,922
TRACTOR
Filed June 20, 1941    2 Sheets-Sheet 1

INVENTOR
GEORGE S. ALLIN
BY
Cook & Robinson
ATTORNEYS

Feb. 23, 1943.   G. S. ALLIN   2,311,922
TRACTOR
Filed June 20, 1941   2 Sheets-Sheet 2
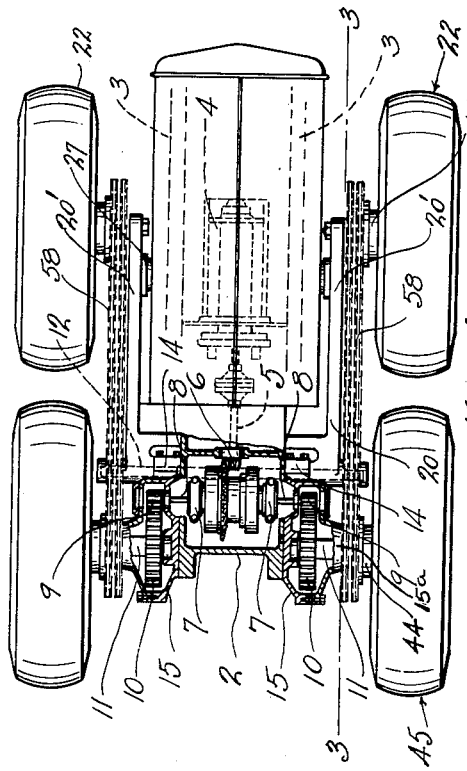
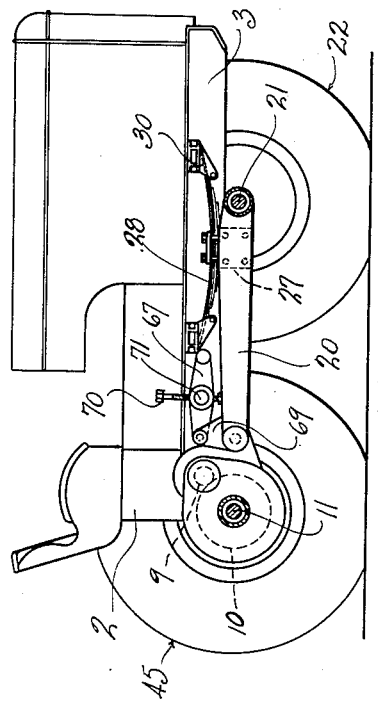
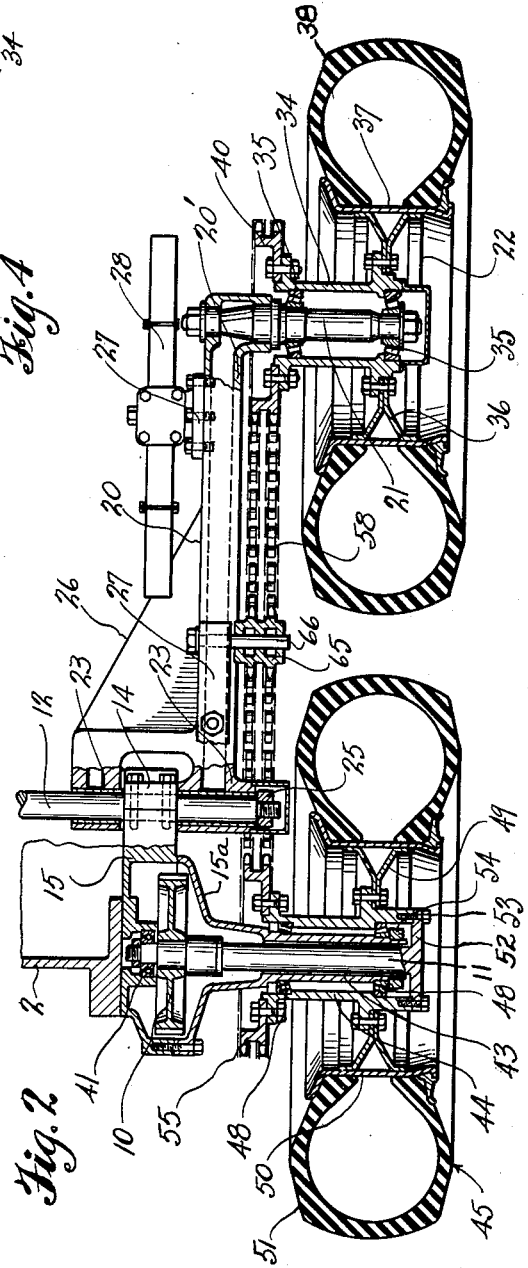
INVENTOR
GEORGE S. ALLIN
BY
Cook & Robinson
ATTORNEYS Patented Feb. 23, 1943

2,311,922

UNITED STATES PATENT OFFICE 2,311,922

TRACTOR

George S. Allin, Seattle, Wash., assignor to Isaacson Iron Works, Seattle, Wash., a corporation of Washington Application June 20, 1941, Serial No. 398,873

6 Claims. (Cl. 180—17)

This invention relates to improvements in tractors, and it has reference more particularly to four-wheeled tractors, wherein there are two wheels at each side of the tractor frame, arranged in tandem and adapted to be driven in unison, and wherein steering of the tractor is effected through the controlled, differential driving of the tandem sets of wheels at opposite sides of the tractor.

It is the principal object of this invention to provide wheel equipped track replacement units designed for an extensively used present day make of tractor known as the "Cletrack" tractor, and which units are readily applicable to such tractors upon the removal therefrom of the crawler tracks and track frames with which they are originally equipped.

It is also an object of the present invention to provide track replacement equipment, according to the present invention, that, upon application, utilizes the original driving, steering and controlled mechanism for the same purposes in connection with the wheel equipped tractor.

It is still another object of the present invention to provide an improved wheel equipped track replacement unit of sturdy and durable construction, capable of operation at relatively high speeds; which is easily removable and having all of the parts thereof adapted for an easy and quick application to the standardized parts of the "Cletrack" tractor.

It is also an object of the invention to provide a wheel equipped tractor of an improved type, utilizing the conventional type of steering and driving means as employed with tractors of the crawler types.

Other objects of the invention are to be found in the details of construction and in the combination of parts and in their method of use, as will hereinafter be fully described.

In accomplishing these and other objects of the invention, I have provided the improved details of construction, the preferred forms of which are illustrated in the accompanying drawings wherein—

Fig. 2 is a horizontal, sectional detail, taken on the line 2—2 in Fig. 1, showing the manner of mounting and driving the wheel equipped unit at one side of the tractor.

Fig. 3 is a vertical section taken on the line 3—3 in Fig. 4.

Fig. 4 is a plan view of the tractor with parts of the main frame housing broken away for better illustration of the power transmission mechanism.

Figure 1:
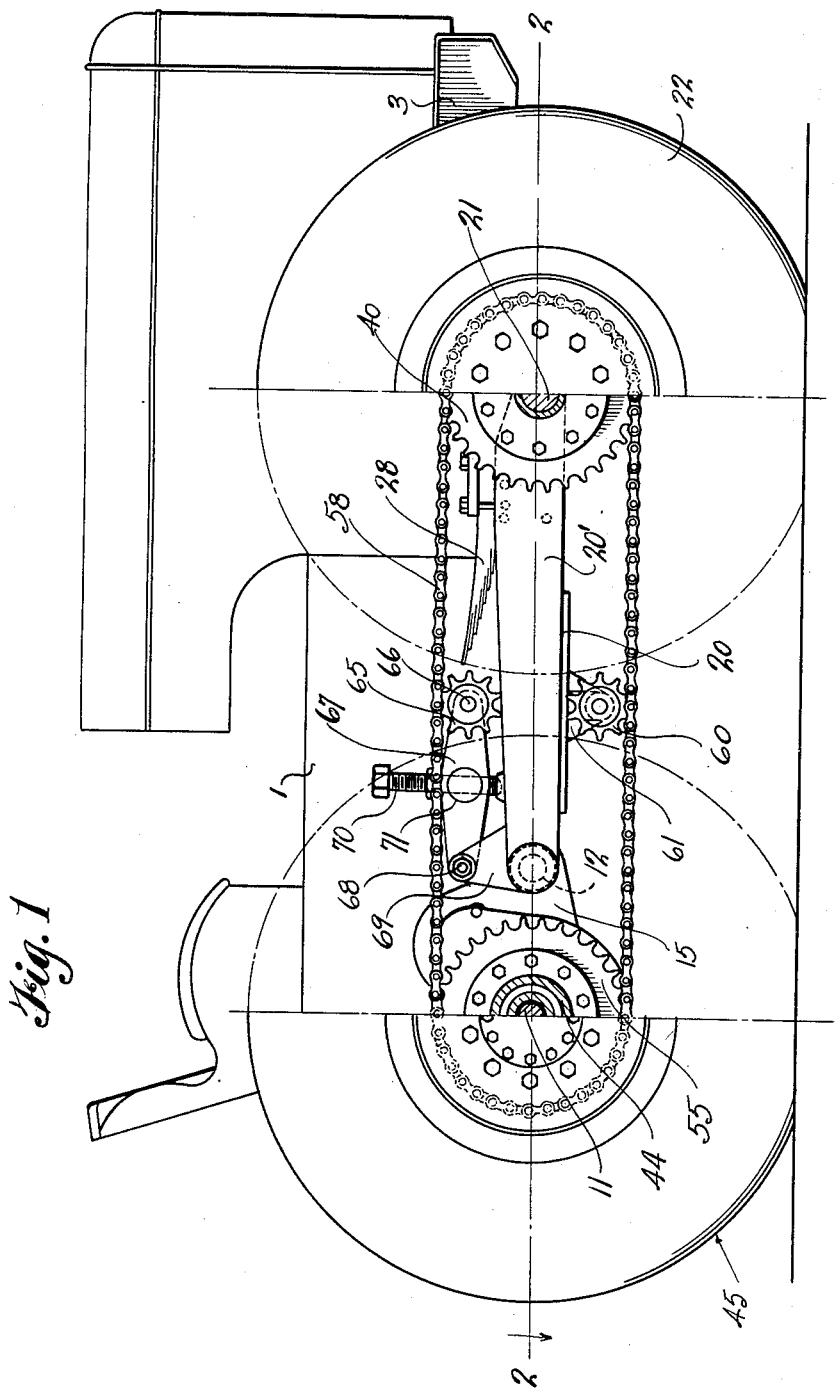
Fig. 1 is a side view of a tractor with parts of the ground wheels on the side shown broken away for better illustration of parts back of the wheels.

Referring more in detail to the drawings:

In Figs. 1 and 3 I have illustrated the particular type or make of tractor for which the present wheel equipped units are designed to be applied as track replacement equipment, or with which they might be applied as original equipment. In their general construction, tractors of this type or make comprise a main frame structure 1, including as a part thereof a closed transmission gear housing 2, located at the rear end of the tractor and from which housing opposite side beams 3 extend forwardly as shown. Supported between the side beams 3 near the forward end of the frame, is an engine, or prime mover, which is indicated in dotted lines in Fig. 4, by reference numeral 4. The engine 4 has its drive shaft 5 extending rearwardly therefrom and connected through the conventional arrangement of gear wheels, as indicated at 6, and clutch and brake devices 7, with transversely alined shafts 8 that are extended to opposite sides of the tractor as noted in Fig. 4. Each of the shafts 8 is equipped at its outer end with a gear wheel 9 which operates in mesh with relatively large gear wheels 10 on transversely alined and outwardly extending shafts 11 which serve, as presently described, for driving the ground wheels of the present track replacement units.

Extended transversely of the main fame, beneath it and near its rearward end, is a pivot and supporting axle or shaft 12. This is fixed rigidly in place to support the main frame structure by overlying clamp plates 14 that are bolted to the forward faces of the gear housings 15, as will be noted by reference to Fig. 2. The gear housings 15 are bolted or otherwise fixedly secured to the opposite side walls of the gear case 2 and each encloses therein the corresponding gear wheels 9 and 10 as will be best understood by reference to Fig. 4.

The opposite ends of the pivot axle 12 extend somewhat beyond the opposite longitudinal side beams 3 of the main frame, and in the usual "Cletrack" tractor design, these extended end portions mount the crawler track frames thereon, but in the present instance the extended end portions of the pivot axle are made somewhat shorter and serve to mount at each side of the tractor frame, a horizontal forwardly extended swing frame 20, which at their forward ends are equipped with outwardly directed spindles 21 about which the front wheel 22 of the tandem sets are revolubly mounted.

Each swing frame 20, as noted in Fig. 2, is formed at its base end or mounting end with spaced alined bearings 23—23 which are applied to the corresponding end portion of the pivot axle closely adjacent opposite sides of the clamp plate 14 at that side. Also, a nut 25 is applied to a threaded end portion of the pivot axle to retain the pivot shaft against endwise slippage. An arm 20' extends forwardly from the base portion of the swing frame, parallel with the adjacent longitudinal side beam 3 of the tractor frame, and a bracing web 26 is extended across the angle between the arm 20' and the base portion of the frame to give added rigidity and strength thereto. Near its forward end and at its inner side, the arm 20' of the swing frame mounts a bracket 27, and this mounts thereon a spring 28, which extends parallel with and along the outside of the frame beam 3 and at its opposite ends is contained in supporting and guide bearings 30 that are fixed to the beam as seen in Fig. 3. Thus, the forward end portion of the main frame is resiliently supported from the swing frame for oscillation about the pivot axle 12 in accordance with the yielding movement of the supporting spring.

Each front wheel 22, as herein shown, comprises a tubular or cylindrical hub portion 34 in which spaced sets of taper bearings 35 are located and which mount the wheel revolubly on the spindle. Fixed to the hub about its outer end portion, is a body disk 36 which mounts rim 37 which carries a pneumatic tire indicated at 38. Bolted co-axially to the inner end of the hub is a sprocket wheel 40 through which the driving of the front wheel is accomplished, as will presently be understood.

The transversely alined shafts 11 on which the driven gear wheels 10 are fixed, are revolubly mounted at their inner ends within bearings 41 contained in the housings 15. These housings 15 have cover sections 15a removably bolted thereover, and these extend outwardly therefrom as shown in Fig. 2. These housings 15a form tubular spindle shafts 43 within which the shafts 11 are revolubly contained and about which the rear ground wheels 45 of the tandem sets are revolubly mounted in alinement with the corresponding front wheels 22.

As will be observed best in Fig. 2, each rear wheel comprises a cylindrical hub portion 44 which is revolubly mounted about the corresponding spindle portion 43 of the housing 15a and is supported thereon through the mediacy of spaced sets of taper bearings 48. The wheels 45 also comprise body disks 49 which mount the rims 50 about which the pneumatic tires 51 are applied.

Each of the driving shafts 11 extends slightly beyond the outer end of the enclosing portion of the corresponding tubular spindle and is formed with an integral end disk or plate 52 that overlies and is fixed by bolts 53 to the outer end of the hub portion 44 of the wheel 45. This hub is internally shouldered to seat the outer end bearing thereagainst and a nut 54 threaded onto the other end of the tubular spindle against the bearing thus retains the parts functionally assembled.

The front and rear wheels of each tandem set are here shown as being in tracking alinement and are of such diameter that they leave little space between them. This will be understood by reference to Fig. 4. At their inner ends the hub portions of the rear wheels are equipped with sprocket wheels 55 which are alined with the sprocket wheels 40 on the hubs of the front wheels and sprocket chain belts 58 extend about the alined sprocket wheels so that the ground wheels of each set will be driven in unison. A chain supporting idler sprocket wheel 60 is mounted by a bracket 61 on the under side of the swing frame arm, and the lower run of the chain belt operates over this sprocket wheel, which is located at an intermediate point between the ground wheels. There is also a chain tightening idler sprocket wheel 65 supported on a pivot 66 at one end of a lever arm 67 to engage with the upper run of the sprocket chain belt. The lever 67 is pivotally mounted at its end by a pivot bolt 68 extended through an upstanding lug 69 at the rear end of the swing frame arm and an adjusting bolt 70 is threaded downwardly through a pivot bearing 71 in the lever to engage with the swing frame arm 20' for adjusting the position of the idler sprocket 65 to place more or less tension on the belt.

It is to be understood that, while I have shown the tandem wheels as being driven in unison, it is apparent that under some conditions, it is possible and may be preferable to drive only the rear wheels. If such should be desired, it is necessary only to remove the connecting chain belts.

A tractor employing the present wheeled equipment, whether it be as original equipment, or is later applied to replace the crawler tracks, provides for relatively high speed travel and overcomes the objection that is usually raised as to its use on paved highways.

Having thus described my invention, what I claim as new therein and desire to secure by Letters Patent is:

1. A tractor comprising a main frame, a transverse pivot shaft fixed therein, laterally projecting tubular spindles fixed to the opposite sides of the frame rearwardly of the pivot shaft, ground wheels revolubly mounted on said spindles, swing frames mounted on the pivot shaft and extended forwardly thereof along opposite sides of the main frame, wheel mounting spindles extending from the forward ends of said swing frames, ground wheels mounted on said spindles in tandem alinement with the first mentioned wheels, means for driving each of the forward wheels in the tandem sets in unison with and from the corresponding rearward wheel, and driven shafts extending through the said tubular spindles and having driving connections at their outer ends with the corresponding rearward wheels.

2. A tractor comprising a main frame, laterally projecting tubular spindles fixed in axial alinement to the opposite sides of the said frame, a pair of vertically oscillating swing frames supported from the main frame and extending along opposite sides thereof, a wheel mounting spindle at the oscillating end of each swing frame, ground wheels arranged in tandem sets at each side of the main frame, one wheel of each set being revoluble on the tubular spindle at that side of the frame and the other wheel of the set being revoluble on the spindle of the corresponding swing frame, driven axles extended axially of the tubular spindles beyond their outer ends and connected at their outer ends with the wheels for driving the latter.

3. A tractor as in claim 2 wherein sprocket wheels are mounted by said ground wheels, and chain belts extend about the sprockets of wheels of the same tandem set to cause them to turn in unison.

4. A tractor comprising a main frame, a transverse pivot shaft fixed in the said frame at an intermediate location, tubular spindles fixed to the frame and extended laterally to opposite sides of the tractor at a location rearwardly of the pivot shaft, ground wheels revolubly mounted on said spindles, a pair of swing frames, mounted on said pivot shaft and extended forwardly thereof along opposite sides of the main frame, resilient means supporting the forward portion of the tractor frame from the forward ends of the swing frames, wheel mounting spindles extended from the swing frames, ground wheels mounted on said spindles in tracking alinement with the first mentioned ground wheels, means connecting tandem wheels of the same set to rotate in unison, and driving axles extended outwardly through the tubular spindles and connected at their outer ends to the wheels on said spindles for driving the latter.

5. In a tractor of the character described, a main frame structure including a gear case, transversely alined drive shafts mounted in the gear case and extended to opposite sides thereof, a transverse pivot shaft fixed in the main frame, means for driving said transversely alined drive shafts, gear housings fixed to the gear case at opposite sides thereof; each of said housings being formed with a tubular, and outwardly extended spindle portion, ground wheels with hub portions revolubly mounted on said spindle portions, wheel driving axles contained coaxially of said tubular spindles, means at the outer ends of said axles fixing them to the hubs of the corresponding wheels for driving the latter and means at the inner ends of said axles effecting driving connections with the outer ends of said transversely alined drive shafts, swing frames mounted on said pivot shaft and supporting the forward end of the tractor frame and ground wheels on the said frames.

6. In a tractor, a main frame structure including a gear case at the rear end, a transverse pivot shaft fixed in the main frame somewhat forward of the rear end, gear housings fixed to the gear case at opposite sides, each formed with an outwardly extended tubular spindle, ground wheels revolubly mounted on said spindles, swing frames mounted by the pivot shaft to extend forwardly and along opposite sides of the frame, springs mounted by the forward ends of the swing frames in supporting contact with the forward portion of the main frame, spindles extended outwardly from the swing frames, ground wheels mounted by said spindles in tracking alinement with the wheels of the first mentioned spindles, driving axles mounted in the tubular spindles and having driving connection at their outer ends with the wheels on said spindles, a prime mover mounted in the main frame, and having driving connections with the driving axles for driving and steering control of the tractor.

GEORGE S. ALLIN.